US012602662B2

(12) United States Patent
Maikhuri et al.

(10) Patent No.: US 12,602,662 B2
(45) Date of Patent: Apr. 14, 2026

(54) INTELLIGENT GENERATION OF JOB PROFILES

(71) Applicant: Dell Products L.P., Round Rock, TX (US)

(72) Inventors: Ajay Maikhuri, Bangalore (IN); Dhilip Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 332 days.

(21) Appl. No.: 18/052,314

(22) Filed: Nov. 3, 2022

(65) Prior Publication Data

US 2024/0152871 A1 May 9, 2024

(51) Int. Cl.
*G06Q 10/1053* (2023.01)

(52) U.S. Cl.
CPC ................................ *G06Q 10/1053* (2013.01)

(58) Field of Classification Search
CPC .................................................. G06Q 10/1053
See application file for complete search history.

(56) References Cited

U.S. PATENT DOCUMENTS 9,734,464 B2 8/2017 Angell et al.
10,204,501 B2 2/2019 Chong et al.
10,643,080 B2 5/2020 Rokade et al.
10,666,594 B2 5/2020 Pfriem et al.
10,706,233 B2 * 7/2020 Cookson .............. G06Q 10/107
10,713,268 B1 7/2020 Kannan et al.
10,896,331 B2 1/2021 Man
11,064,044 B2 7/2021 Liensberger et al.
11,089,132 B2 8/2021 Liensberger et al.
11,593,685 B1 2/2023 Chan et al.

(Continued)

FOREIGN PATENT DOCUMENTS

KR 10-1723283 B1 4/2017
KR 20190029509 A * 3/2019

OTHER PUBLICATIONS

J. S. Vimali and S. Murugan, "A Text Based Sentiment Analysis Model using Bi-directional LSTM Networks," 2021 6th International Conference on Communication and Electronics Systems (ICCES), Coimbatre, India, 2021, pp. 1652-1658, https://ieeexplore.ieee.org/document/9489129?source=IQplus (Year: 2021).*

(Continued)

*Primary Examiner* — Jessica Lemieux
*Assistant Examiner* — Emily M. Kraisinger
(74) *Attorney, Agent, or Firm* — DALY, CROWLEY, MOFFORD & DURKEE, LLP

(57) ABSTRACT

In one aspect, an example methodology implementing the disclosed techniques includes, by a computing device, receiving activity data corresponding to an activity of an employee and deriving context and information from the activity data. The method also includes, by the computing device, associating the context and information to a job position and storing the context and information within a repository. The method further includes, by the computing device, responsive to a request to generate a job profile for the job position, retrieving, from the repository, the context and information associated with the job position and generating the job profile based on the retrieved context and information.

16 Claims, 9 Drawing Sheets

(56) References Cited

U.S. PATENT DOCUMENTS

| | | | | |
|---|---|---|---|---|
| 12,229,707 | B2 | 2/2025 | Maikhuri et al. | |
| 2010/0223212 | A1 | 9/2010 | Manolescu et al. | |
| 2014/0122508 | A1* | 5/2014 | Eigner | G06F 16/00 707/752 |
| 2015/0302328 | A1 | 10/2015 | Zeng et al. | |
| 2016/0063874 | A1 | 3/2016 | Czerwinski et al. | |
| 2016/0260046 | A1 | 9/2016 | Cai | |
| 2018/0046968 | A1* | 2/2018 | Carter | G06Q 10/1053 |
| 2018/0107962 | A1 | 4/2018 | Lundin et al. | |
| 2019/0138967 | A1 | 5/2019 | Akella | |
| 2019/0279164 | A1 | 9/2019 | Byron et al. | |
| 2020/0090089 | A1 | 3/2020 | Aston et al. | |
| 2020/0211532 | A1 | 7/2020 | Rule et al. | |
| 2020/0364588 | A1 | 11/2020 | Knox | |
| 2021/0109497 | A1 | 4/2021 | Man et al. | |
| 2021/0150486 | A1* | 5/2021 | Ghosh | G06Q 10/06393 |
| 2022/0036314 | A1* | 2/2022 | Alexander | G06F 16/90335 |
| 2023/0131236 | A1* | 4/2023 | Khan | G06Q 10/1053 705/321 |
| 2023/0297777 | A1* | 9/2023 | Dimitriadis | G06F 40/30 |
| 2024/0330863 | A1* | 10/2024 | Hajarnis | G06Q 10/1053 |

OTHER PUBLICATIONS

U.S. Final Office Action dated Jul. 29, 2024 for U.S. Appl. No. 18/051,066; 16 Pages.

Response to U.S. Final Office Action dated Jul. 29, 2024 for U.S. Appl. No. 18/051,066; Response filed Oct. 21, 2024; 31 Pages.

U.S. Final Office Action dated Sep. 24, 2024 for U.S. Appl. No. 17/818,764; 45 Pages.

U.S. Appl. No. 18/051,066, filed Oct. 31, 2022, Maikhuri et al.

U.S. Appl. No. 17/818,764, filed Aug. 10, 2022, Maikhuri et al.

Becerra et al., "Infrared Thermal Imaging Monitoring on Hands When Performing Repetitive Tasks: An Experimental Study;" PLoS One 16(5); Published Online May 12, 2021; 55 Pages.

Esen, "Occupational Health and Safety with Video Recognition;" Blog from Intenseye (https://www.intensye.com); Feb. 8, 2022; 12 Pages.

U.S. Bureau of Labor Statistics, "2.8 Million Nonfatal Workplace Injuries and Illnesses Occurred in Private Industry in 2019;" Publication from TED: The Economics Daily; Nov. 6, 2020; 2 Pages.

Vrigkas et al., "A Review of Human Activity Recognition Methods;" Review Article in Frontiers in Robotics and AI 2(28); Nov. 2015; 81 Pages.

Wang et al., "Discriminative Hierarchical Part-Based Models for Human Parsing and Action Recognition;" Journal of Machine Learning Research, vol. 13; Oct. 2012; pp. 3075-3102; 28 Pages.

Wiggers, "Computer Vision-Powered Workplace Safety Systems Could Lead to Bias and Other Harms;" Article from VentureBeat; Sep. 21, 2021; 16 Pages.

U.S. Non-Final Office Action dated Mar. 7, 2024 for U.S. Appl. No. 17/818,764; 30 Pages.

U.S. Non-Final Office Action dated Apr. 3, 2024 for U.S. Appl. No. 18/051,066; 15 Pages.

Response to U.S. Non-Final Office Action dated Mar. 7, 2024 for U.S. Appl. No. 17/818,764; Response filed Jun. 7, 2024; 19 Pages.

Response to U.S. Non-Final Office Action dated Apr. 3, 2024 for U.S. Appl. No. 18/051,066; Response filed Jul. 1, 2024; 18 Pages.

Marin-Jimenez et al., "Deep Multi-Task Learning for Gait-Based Biometrics;" Proceedings of the 2017 IEEE International Conference on Image Processing (ICIP); Jan. 2017; 5 Pages.

Response to Final Office Action dated Sep. 24, 2024 for U.S. Appl. No. 17/818,764; Response Filed Dec. 20, 2024; 24 Pages.

U.S. Notice of Allowance dated Dec. 18, 2024 for U.S. Appl. No. 18/051,066; 11 Pages.

Office Action dated Apr. 9, 2025 for U.S. Appl. No. 17/818,764, 55 pages.

Response to Office Action dated Apr. 9, 2025 filed on Jun. 25, 2025 for U.S. Appl. No. 17/818,764, 19 pages.

* cited by examiner

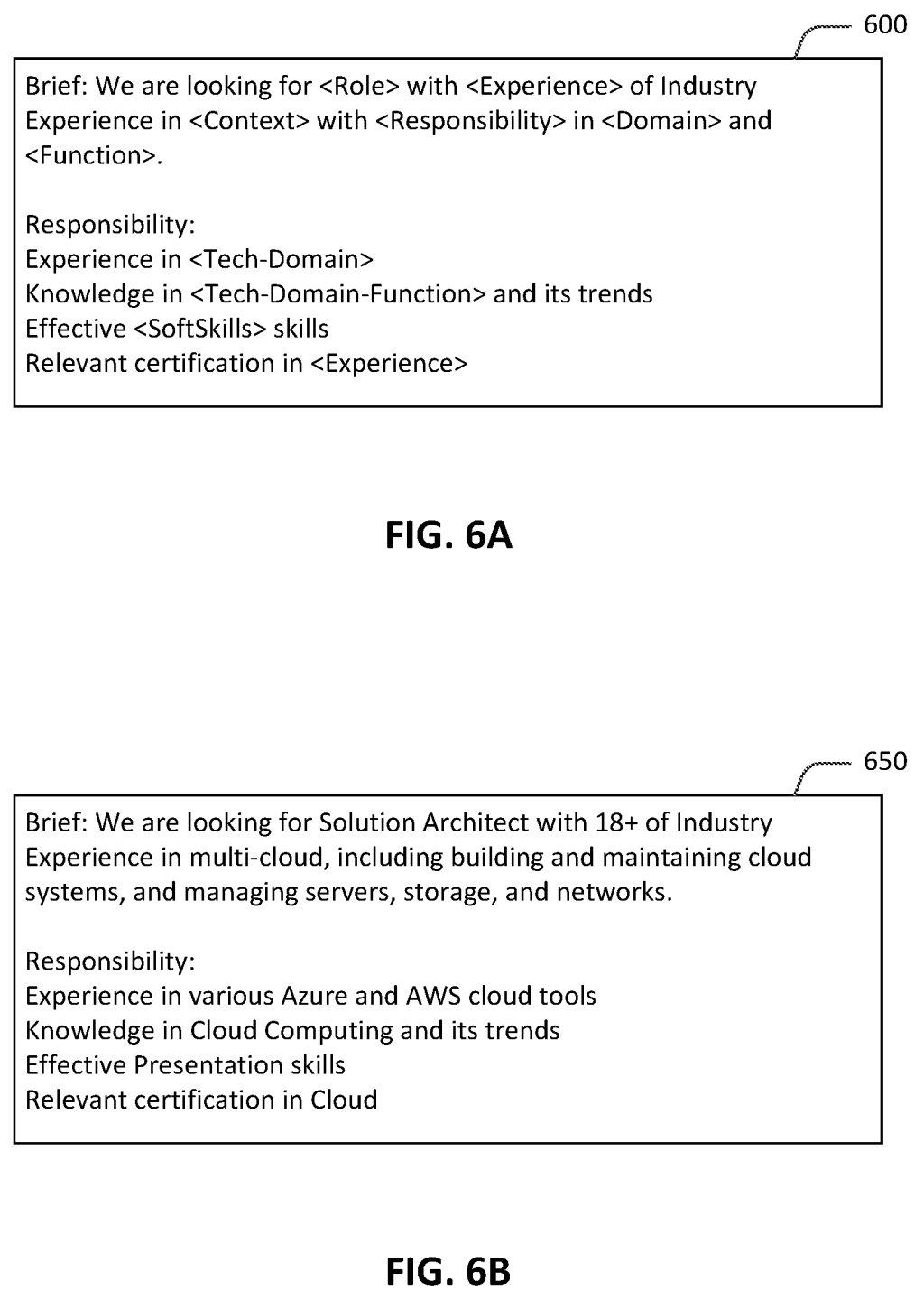

600

Brief: We are looking for <Role> with <Experience> of Industry Experience in <Context> with <Responsibility> in <Domain> and <Function>.

Responsibility:
Experience in <Tech-Domain>
Knowledge in <Tech-Domain-Function> and its trends
Effective <SoftSkills> skills
Relevant certification in <Experience>

Brief: We are looking for Solution Architect with 18+ of Industry Experience in multi-cloud, including building and maintaining cloud systems, and managing servers, storage, and networks.

Responsibility:
Experience in various Azure and AWS cloud tools
Knowledge in Cloud Computing and its trends
Effective Presentation skills
Relevant certification in Cloud

FIG. 6B

Cloud Computing Environment 704

Job Profile Service 708

Interface Module 710

Personal Knowledge Repository 712

Client Device 702

Job Profile Client 706

Context Analysis Module 714

Recommendation Module 720

Text Sentiment Analysis Module 716

Message Generation Module 722

Voice Sentiment Analysis Module 718

900

Receive activity data
902

Derive context and information from the activity data
904

Associate the context and information to a job position
906

Store the context and information within a repository
908

Receive request to generate a job profile for a job position
910

Retrieve the context and information associated with the job
position from the repository
912

Generate the job profile for the job position based on the
retrieved context and information
914

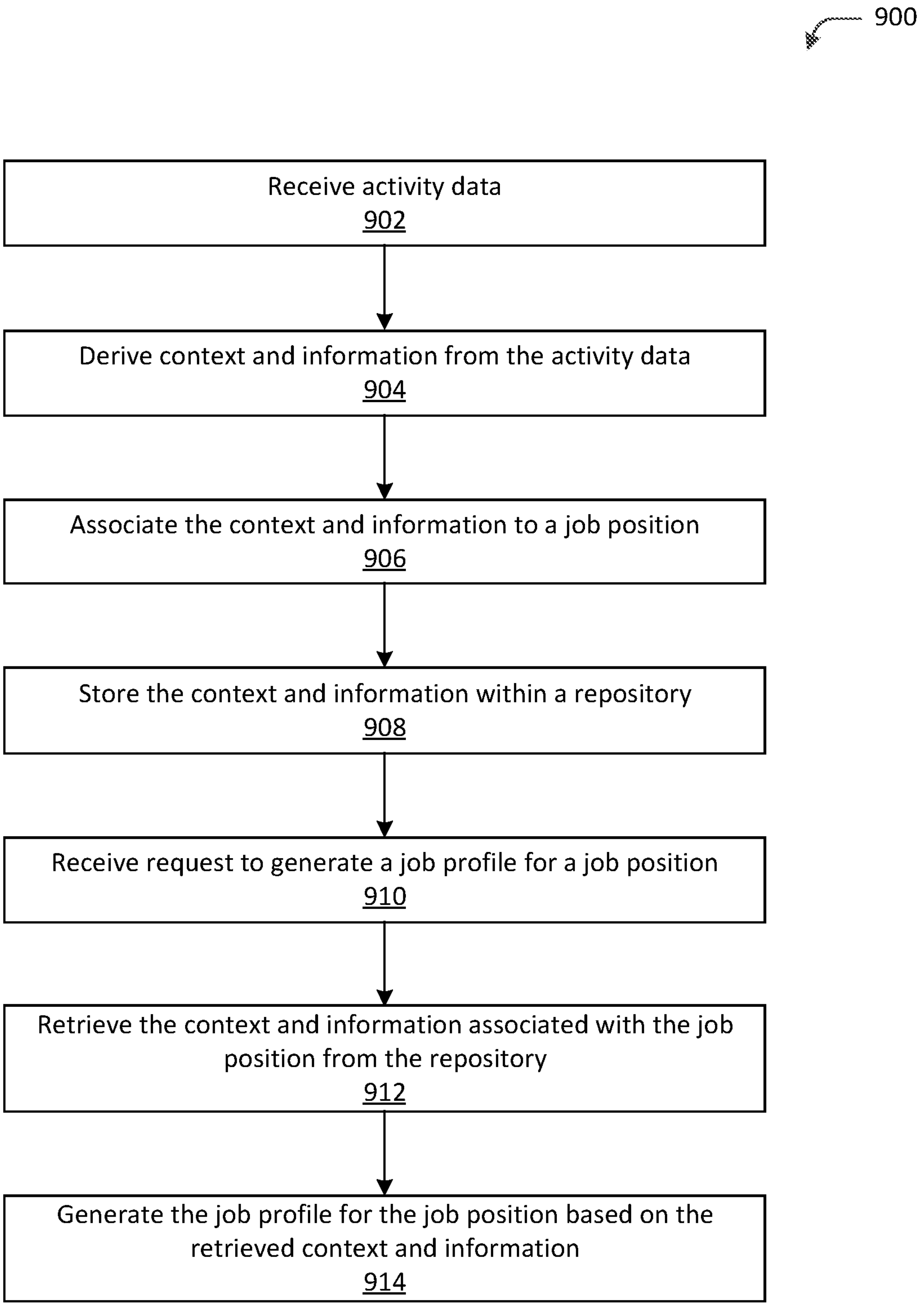

FIG. 9

INTELLIGENT GENERATION OF JOB PROFILES

BACKGROUND

A job profile, or job description, is a document that contains relevant information regarding a job position or job function. A job profile can include an explanation of the competencies, responsibilities, necessary skills, desired abilities, and education and credentials required for the position. Organizations can create and use job profiles to improve their chances of attracting and hiring desirable candidates. Conversely, prospective candidates can use the job profile to determine their eligibility for an open position prior to applying for the job.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

A descriptive job profile can increase the odds of attracting candidates that are properly qualified for a respective position. Organizations typically rely on managers to develop the job profiles under the assumption that the managers best understand the requirements of the employees who fill the positions. For example, when an employee (e.g., a former employee) leaves the organization, a hiring manager may create a job profile to assist in the identification of required qualifications of potential candidates to fill the open position. The challenge for the manager, however, is that the skills the former employee utilized to perform the job, such as how the employee solved problems, addressed management, utilized technology, and the like, are often hidden and unknown to the manager. This may be especially true in today's hybrid work environments. As a result, many job profiles within an organization tend to be generic (e.g., not identify the specific skills required in the job position) or inaccurate. In some cases, job profiles may not exist for job positions within an organization. The present disclosure relates to systems and methods for analyzing an employee's activities related to the performance of the job and intelligently generating a job profile for the job position associated with the employee.

In accordance with one illustrative embodiment provided to illustrate the broader concepts, systems, and techniques described herein, a method includes, by a computing device, receiving activity data corresponding to an activity of an employee and deriving context and information from the activity data. The method also includes, by the computing device, associating the context and information to a job position and storing the context and information within a repository. The method further includes, by the computing device, responsive to a request to generate a job profile for the job position, retrieving, from the repository, the context and information associated with the job position and generating the job profile based on the retrieved context and information.

In some embodiments, the activity includes a written communication with a colleague.

In some embodiments, the activity includes an oral communication with a colleague.

In some embodiments, the activity includes an access of a document related to the job position.

In some embodiments, the activity includes a surfing task.

In some embodiments, the context and information include one or more of a role, a domain, an intent, and a sentiment.

In some embodiments, the activity data is received over a secure communication channel.

In some embodiments, the deriving the context and information includes use of a first machine learning (ML) model.

In some embodiments, the generating the job profile includes use of a second ML model.

In some embodiments, the generating the job profile includes completing a job profile template generated for the job position.

In some embodiments, the context and information are stored in an encrypted format within the repository.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 6A is a diagram showing an illustrative job profile template, in accordance with an embodiment of the present disclosure.

FIG. 6B is a diagram showing an example job profile generated from the job profile template of FIG. 6A, in accordance with an embodiment of the present disclosure.

FIG. 9 is a flow diagram of an example process for generating a job profile, in accordance with an embodiment of the present disclosure.

DETAILED DESCRIPTION

Figure 1:
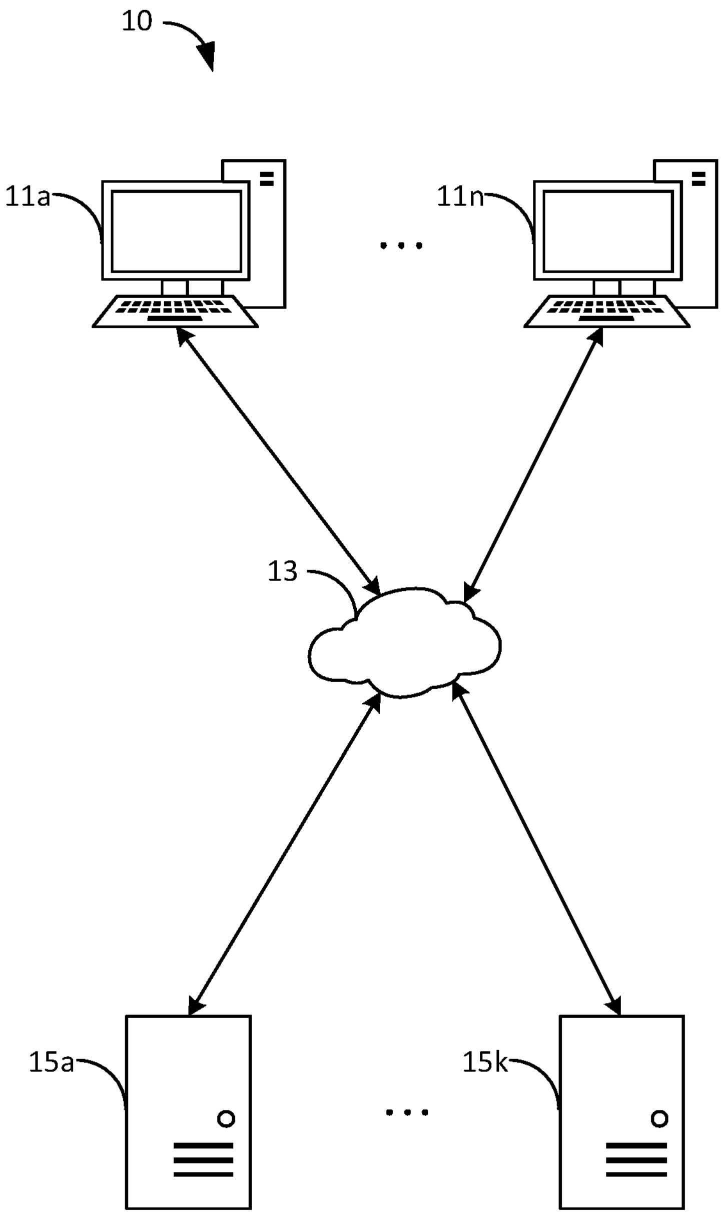
FIG. 1 is a diagram illustrating an example network environment of computing devices in which various aspects of the disclosure may be implemented, in accordance with an embodiment of the present disclosure.

Referring now to FIG. 1, shown is a diagram illustrating an example network environment 10 of computing devices in which various aspects of the disclosure may be implemented, in accordance with an embodiment of the present disclosure. As shown, environment 10 includes one or more client machines 11*a*-11*n* (11 generally), one or more server machines 15*a*-15*k* (15 generally), and one or more networks 13. Client machines 11 can communicate with server machines 15 via networks 13. Generally, in accordance with client-server principles, a client machine 11 requests, via network 13, that a server machine 15 perform a computation or other function, and server machine 15 responsively fulfills the request, optionally returning a result or status indicator in a response to client machine 11 via network 13.

In some embodiments, client machines 11 can communicate with remote machines 15 via one or more intermediary appliances (not shown). The intermediary appliances may be positioned within network 13 or between networks 13. An intermediary appliance may be referred to as a network interface or gateway. In some implementations, the intermediary appliance may operate as an application delivery controller (ADC) in a datacenter to provide client machines (e.g., client machines 11) with access to business applications and other data deployed in the datacenter. The intermediary appliance may provide client machines with access to applications and other data deployed in a cloud computing environment, or delivered as Software as a Service (SaaS) across a range of client devices, and/or provide other functionality such as load balancing, etc.

Client machines 11 may be generally referred to as computing devices 11, client devices 11, client computers 11, clients 11, client nodes 11, endpoints 11, or endpoint nodes 11. Client machines 11 can include, for example, desktop computing devices, laptop computing devices, tablet computing devices, mobile computing devices, workstations, and/or hand-held computing devices. Server machines 15 may also be generally referred to a server farm 15. In some embodiments, a client machine 11 may have the capacity to function as both a client seeking access to resources provided by server machine 15 and as a server machine 15 providing access to hosted resources for other client machines 11.

Server machine 15 may be any server type such as, for example, a file server, an application server, a web server, a proxy server, a virtualization server, a deployment server, a Secure Sockets Layer Virtual Private Network (SSL VPN) server; an active directory server; a cloud server; or a server executing an application acceleration program that provides firewall functionality, application functionality, or load balancing functionality. Server machine 15 may execute, operate, or otherwise provide one or more applications. Non-limiting examples of applications that can be provided include software, a program, executable instructions, a virtual machine, a hypervisor, a web browser, a web-based client, a client-server application, a thin-client, a streaming application, a communication application, or any other set of executable instructions.

In some embodiments, server machine 15 may execute a virtual machine providing, to a user of client machine 11, access to a computing environment. In such embodiments, client machine 11 may be a virtual machine. The virtual machine may be managed by, for example, a hypervisor, a virtual machine manager (VMM), or any other hardware virtualization technique implemented within server machine 15.

Networks 13 may be configured in any combination of wired and wireless networks. Network 13 can be one or more of a local-area network (LAN), a wide area network (WAN), a metropolitan area network (MAN), a virtual private network (VPN), a primary public network, a primary private network, the Internet, or any other type of data network. In some embodiments, at least a portion of the functionality associated with network 13 can be provided by a cellular data network and/or mobile communication network to facilitate communication among mobile devices. For short range communications within a wireless local-area network (WLAN), the protocols may include 802.11, Bluetooth, and Near Field Communication (NFC).

Figure 2:
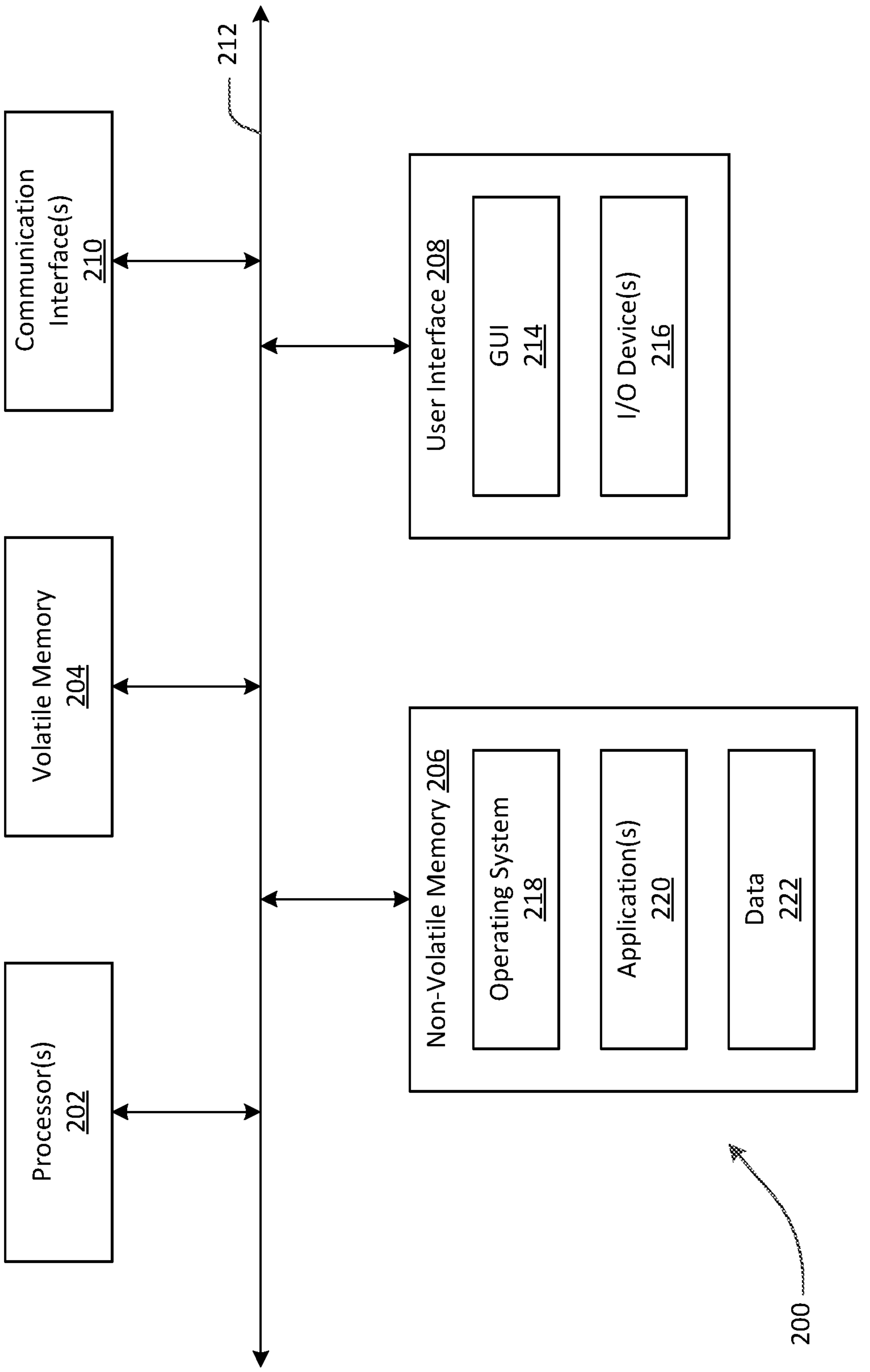
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 200 in which various aspects of the disclosure may be implemented, in accordance with an embodiment of the present disclosure. For instance, client machines 11 and/or server machines 15 of FIG. 1 can be substantially similar to computing device 200. As shown, computing device 200 includes one or more processors 202, a volatile memory 204 (e.g., random access memory (RAM)), a non-volatile memory 206, a user interface (UI) 208, one or more communications interfaces 210, and a communications bus 212.

Non-volatile memory 206 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 208 may include a graphical user interface (GUI) 214 (e.g., a touchscreen, a display, etc.) and one or more input/output (I/O) devices 216 (e.g., a mouse, a keyboard, a microphone, one or more speakers, one or more cameras, one or more biometric scanners, one or more environmental sensors, and one or more accelerometers, etc.).

Non-volatile memory 206 stores an operating system 218, one or more applications 220, and data 222 such that, for example, computer instructions of operating system 218 and/or applications 220 are executed by processor(s) 202 out of volatile memory 204. In one example, computer instructions of operating system 218 and/or applications 220 are executed by processor(s) 202 out of volatile memory 204 to perform all or part of the processes described herein (e.g., processes illustrated and described with reference to FIGS. 4 through 9). In some embodiments, volatile memory 204 may include one or more types of RAM and/or a cache memory that may offer a faster response time than a main memory. Data may be entered using an input device of GUI 214 or received from I/O device(s) 216. Various elements of computing device 200 may communicate via communications bus 212.

The illustrated computing device 200 is shown merely as an illustrative client device or server and may be implemented by any computing or processing environment with any type of machine or set of machines that may have suitable hardware and/or software capable of operating as described herein.

Processor(s) 202 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 202 may be analog, digital or mixed signal. In some embodiments, processor 202 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 210 may include one or more interfaces to enable computing device 200 to access a computer network such as a Local Area Network (LAN), a Wide Area Network (WAN), a Personal Area Network (PAN), or the Internet through a variety of wired and/or wireless connections, including cellular connections.

In described embodiments, computing device 200 may execute an application on behalf of a user of a client device. For example, computing device 200 may execute one or more virtual machines managed by a hypervisor. Each virtual machine may provide an execution session within which applications execute on behalf of a user or a client device, such as a hosted desktop session. Computing device 200 may also execute a terminal services session to provide a hosted desktop environment. Computing device 200 may provide access to a remote computing environment including one or more applications, one or more desktop applications, and one or more desktop sessions in which one or more applications may execute.

Figure 3:
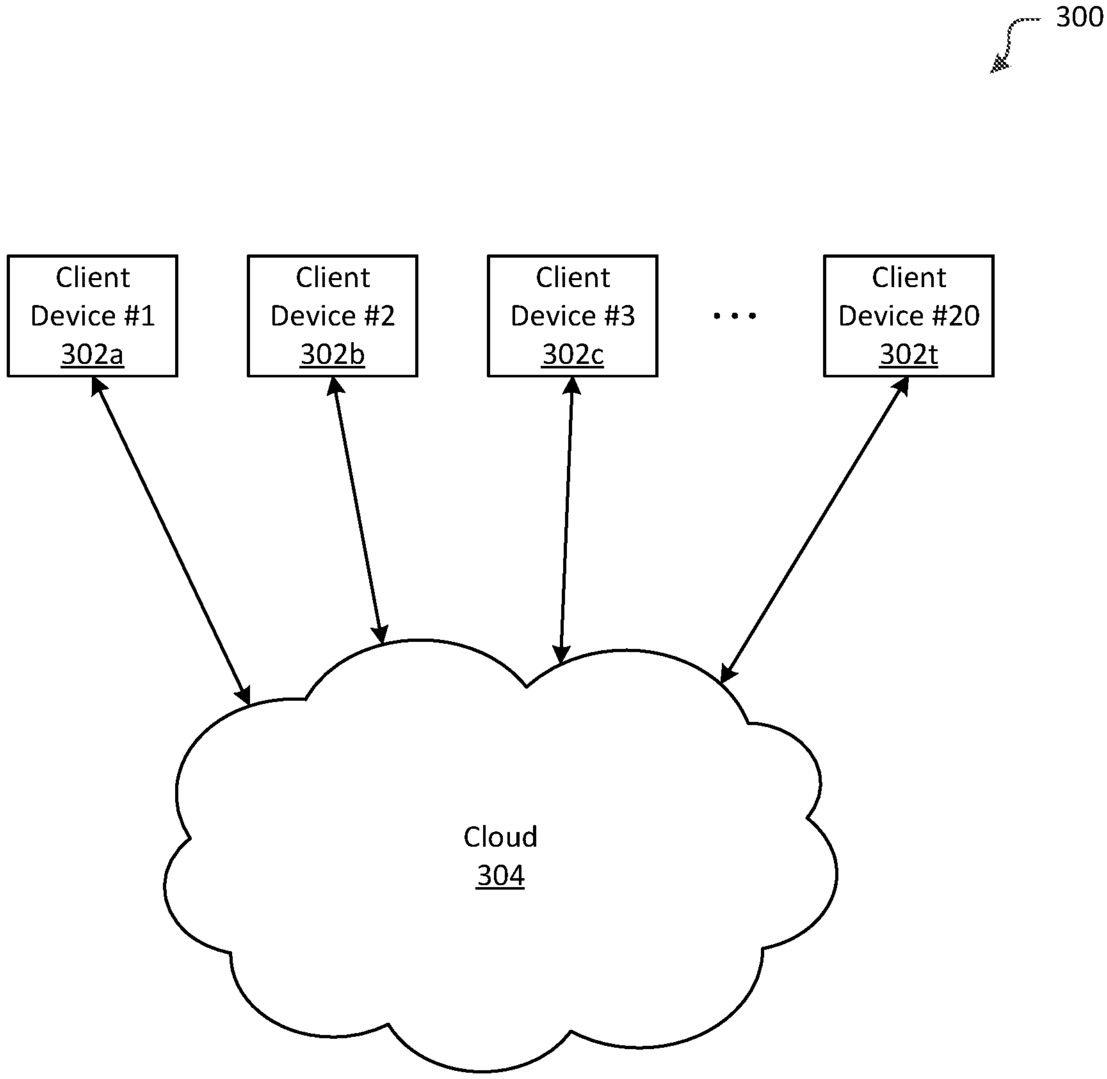
FIG. 3 is a diagram of a cloud computing environment in which various aspects of the concepts described herein may be implemented.

Referring to FIG. 3, shown is a diagram of a cloud computing environment 300 in which various aspects of the concepts described herein may be implemented. Cloud computing environment 300, which may also be referred to as a cloud environment, cloud computing, or cloud network, can provide the delivery of shared computing resources and/or services to one or more users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more client devices 302*a*-302*t* (such as client machines 11 and/or computing device 200 described above) may be in communication with a cloud network 304 (sometimes referred to herein more simply as a cloud 304). Cloud 304 may include back-end platforms such as, for example, servers, storage, server farms, or data centers. The users of clients 302*a*-302*t* can correspond to a single organization/tenant or multiple organizations/tenants. More particularly, in one implementation, cloud computing environment 300 may provide a private cloud serving a single organization (e.g., enterprise cloud). In other implementations, cloud computing environment 300 may provide a community or public cloud serving one or more organizations/tenants.

In some embodiments, one or more gateway appliances and/or services may be utilized to provide access to cloud computing resources and virtual sessions. For example, a gateway, implemented in hardware and/or software, may be deployed (e.g., reside) on-premises or on public clouds to provide users with secure access and single sign-on to virtual, SaaS, and web applications. As another example, a secure gateway may be deployed to protect users from web threats.

In some embodiments, cloud computing environment 300 may provide a hybrid cloud that is a combination of a public cloud and a private cloud. Public clouds may include public servers that are maintained by third parties to client devices 302*a*-302*t* or the enterprise/tenant. The servers may be located off-site in remote geographical locations or otherwise.

Cloud computing environment 300 can provide resource pooling to serve clients devices 302*a*-302*t* (e.g., users of client devices 302*a*-302*n*) through a multi-tenant environment or multi-tenant model with different physical and virtual resources dynamically assigned and reassigned responsive to different demands within the respective environment. The multi-tenant environment can include a system or architecture that can provide a single instance of software, an application, or a software application to serve multiple users. In some embodiments, cloud computing environment 300 can include or provide monitoring services to monitor, control, and/or generate reports corresponding to the provided shared resources and/or services.

In some embodiments, cloud computing environment 300 may provide cloud-based delivery of various types of cloud computing services, such as Software as a service (SaaS), Platform as a Service (PaaS), Infrastructure as a Service (IaaS), and/or Desktop as a Service (DaaS), for example. IaaS may refer to a user renting the use of infrastructure resources that are needed during a specified time period. IaaS providers may offer storage, networking, servers, or virtualization resources from large pools, allowing the users to quickly scale up by accessing more resources as needed. PaaS providers may offer functionality provided by IaaS, including, e.g., storage, networking, servers, or virtualization, as well as additional resources such as, for example, operating systems, middleware, and/or runtime resources. SaaS providers may offer the resources that PaaS provides, including storage, networking, servers, virtualization, operating systems, middleware, or runtime resources. SaaS providers may also offer additional resources such as, for example, data and application resources. DaaS (also known as hosted desktop services) is a form of virtual desktop service in which virtual desktop sessions are typically delivered as a cloud service along with the applications used on the virtual desktop.

Figure 4:
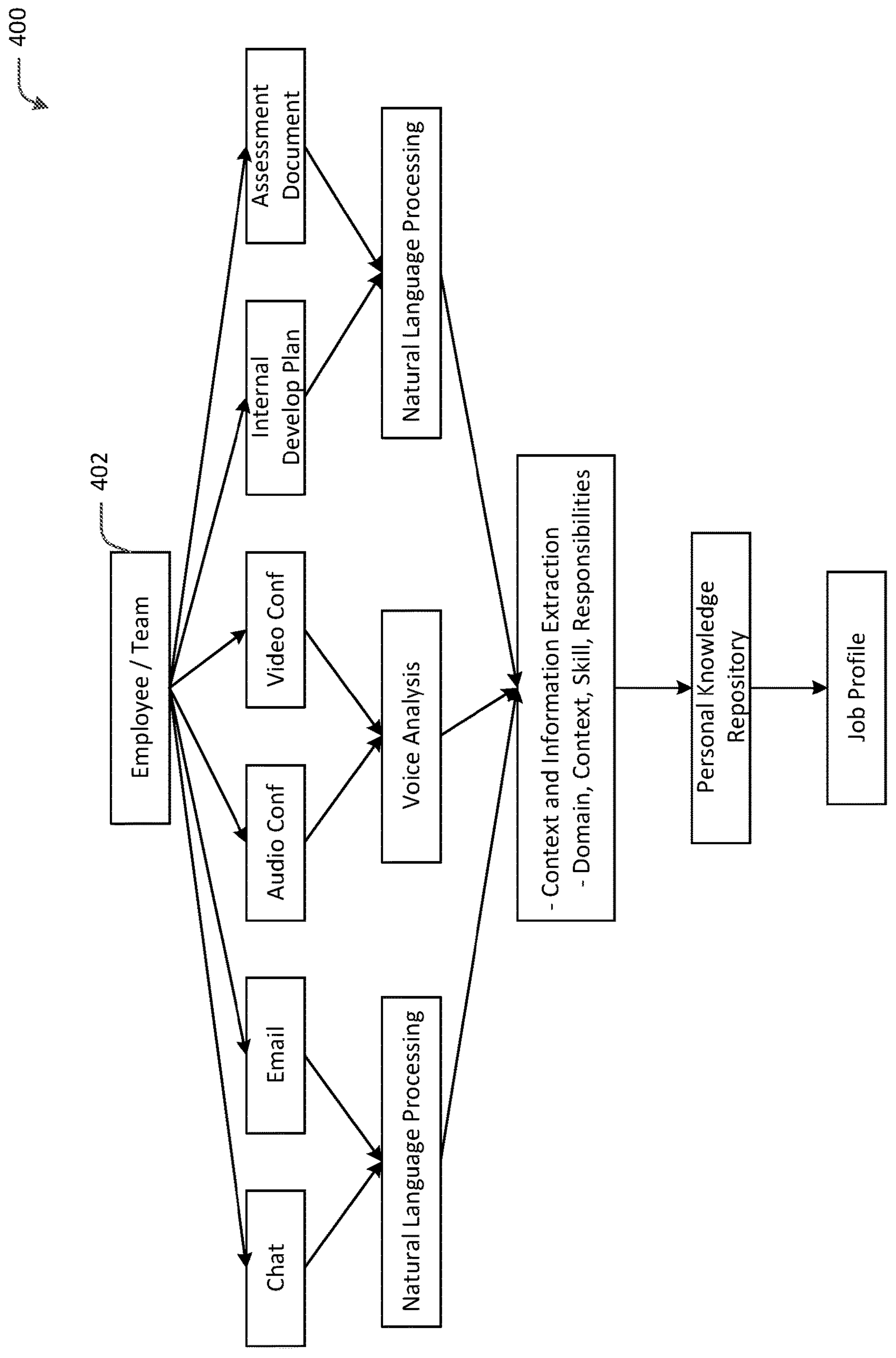
FIG. 4 is a diagram showing illustrative activities that can be assessed to build domain expertise from which to generate job profiles, in accordance with an embodiment of the present disclosure.

FIG. 4 is a diagram 400 showing illustrative activities that can be assessed to build domain expertise from which to generate job profiles, in accordance with an embodiment of the present disclosure. As described previously, a job profile, or job description, is a document that presents a summary of information about a particular job position or job function within an organization. Information contained in a job profile may include, for example, job title, area of expertise, required skills, desired skills, required education and credentials, prior experience, pay grade, residency or immigration status, and the like. A sufficiently descriptive job profile can be used by the organization to successfully fill an open position. Furthermore, the descriptive job profile may help job candidates determine their eligibility for the open position.

Certain embodiments of the concepts, techniques, and structures disclosed herein are generally directed to an artificial intelligence (AI)/machine learning (ML)-powered framework for monitoring work-related activities performed (or "undertaken") by an employee, analyzing the activities to understand the employee's context, role (or "job responsibility" or more simply "responsibility"), domain, and/or intent as they relate to performance of a job position associated with the employee (e.g., employee's job function), and generating a job profile for the job position based on the context, role, domain, and intent understood from the monitored activities. Such context, role, domain, and intent are sometimes referred to herein more simply as "context and information." In embodiments, the framework includes an ML model configured to track and record the activities of individual employees, or teams of employees, in performing their jobs. In some implementations, the ML model may be an intelligent virtual assistant that is configured to operate in stealth mode to monitor activities of the employee. The ML model may build or develop domain expertise about the employee's job position over time based on the monitored activities of the employee or team of employees. For example, the domain expertise may be developed from the context and information derived or extracted from the employee's communications (or "conversations") with other employees. The domain expertise may also be developed from the context and information derived from the employee's interaction with the ecosystem in which the employee operates (e.g., interactions with and/or within the hierarchical organizational structure), as well as documents generated by or for the employee or teams of employees, such as self-assessment documents and performance evaluation documents, for example. The developed domain expertise may be stored or otherwise maintained within a knowledge repository (e.g., a personal knowledge repository) and utilized to generate a job profile for the employee's specific job position.

In more detail, and as shown in the example of FIG. 4, time spent at work by an employee 402 communicating with colleagues via written communications, such as email messages and chat messages, may be tracked and assessed. For example, according to one or more implementations, the emails messages and chat messages may be assessed using various Natural Language Processing (NLP) techniques to understand details about the employee's role and/or job position within the organization (e.g., nature of the job, time spent on projects, learning, leadership presentations, market research, etc.). For example, for a given email message or chat message, NLP techniques can be applied to the text in the message to understand the communication domain, context, intent, sentiment, skills, responsibilities, etc., conveyed by the message.

The employee's oral communications with colleagues, such as audio conferences and video conferences, may also be tracked and assessed. For example, according to one or more implementations, various voice analysis techniques may be utilized to detect speech in the audio data (e.g., audio files) corresponding to the audio conferences and video conferences. The speech in the audio data may then be analyzed to understand details about the employee's role and/or job position within the organization (e.g., nature of the job, time spent on projects, learning, leadership presentations, market research, etc.). That is, the oral communication can be analyzed to identify and understand the context of the communication and capture the expectation of the job position, for example. For example, for a given audio conference or video conference, voice analysis may be applied to the audio data corresponding to the audio/video conference, and the detected speech within the audio data may be analyzed to understand the communication domain, context, intent, sentiment, skills, responsibilities, etc., conveyed during the audio/video conference.

According to various implementations, documents related to or otherwise concerning the employee's job position, such as internal development plans, self-assessment documents, and performance appraisal documents, may also be tracked and assessed. For example, such documents may be assessed using various NLP techniques to understand details about the employee's role and/or job position within the organization. The context and information understood from analyzing the activities may be stored or otherwise maintained within a personal knowledge repository associated with the employee. Contents of the personal knowledge repository may be utilized to generate a job profile for the employee's specific job position.

Figure 5:
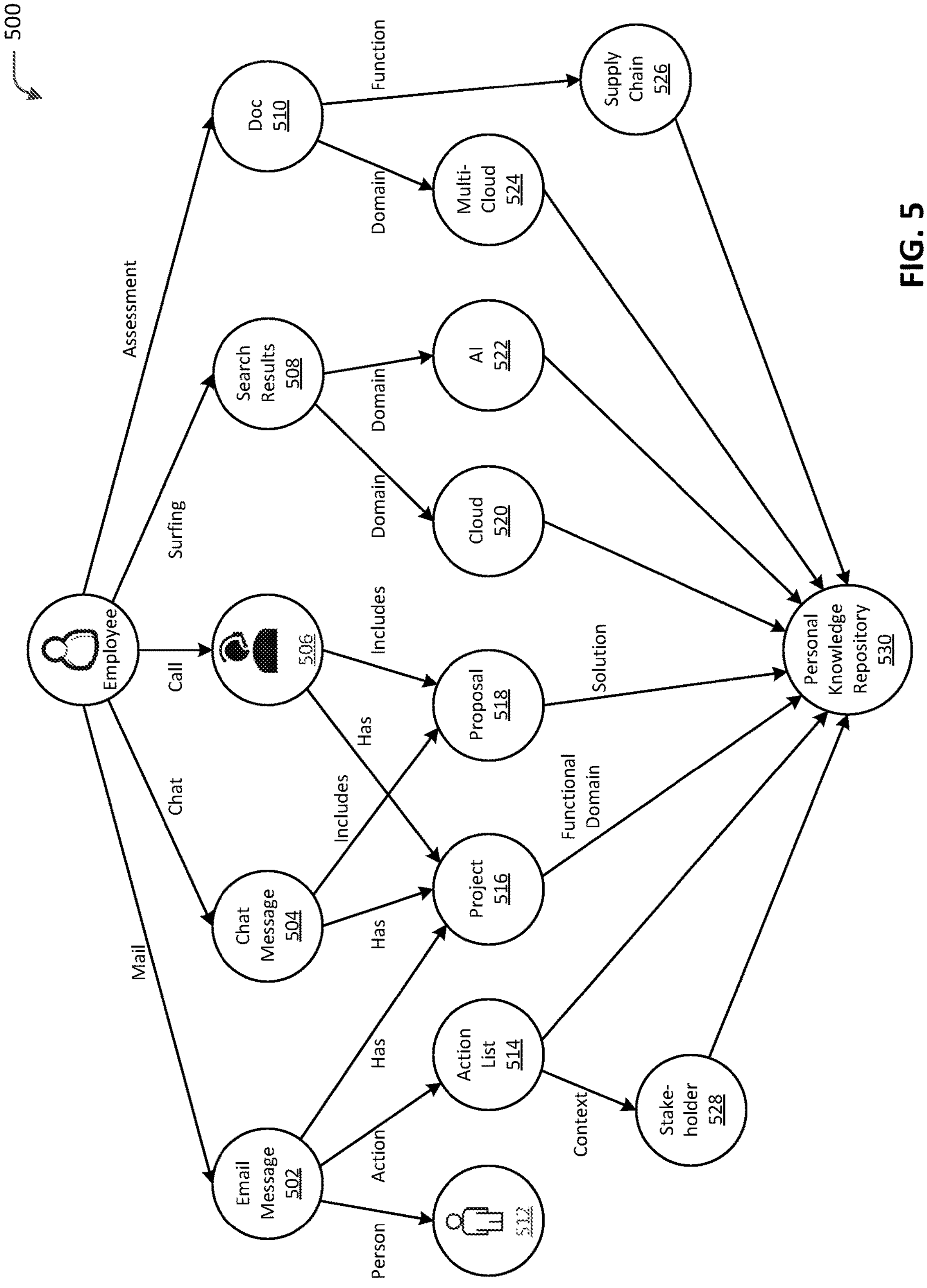
FIG. 5 is a diagram showing a portion of an example activity graph for modeling context and information derived from assessing activities of an employee, in accordance with an embodiment of the present disclosure.

FIG. 5 is a diagram showing a portion of an example activity graph for modeling context and information derived from assessing activities of an employee, in accordance with an embodiment of the present disclosure. Illustrative activity graph 500 corresponds to the activities tracked and recorded for an employee. Activity graph 500 may include multiple entries or nodes (e.g., as represented by circles) organized in a hierarchical tree structure, and edges (e.g., as represented by lines) between certain pairs of nodes which represent a relationship between the nodes. The edges may be rendered as directed arrows providing further indication of how the connected nodes are related to each other.

As can be seen, a first hierarchical level, commonly referred to as a root level, of activity graph 500 includes a root node which represents an employee (e.g., "Employee"). Below the root level may be a second hierarchical level comprised of nodes 502, 504, 506, 508, 510 which represent the tracked activities of the employee. Below the second hierarchical level may be one or more lower hierarchical levels, each lower hierarchical level comprised of one or more nodes which represent context and/or information derived from a node in a higher hierarchical level. As can be seen in the example of FIG. 5, below the second hierarchical level may be a third hierarchical level comprised of nodes 512, 514, 516, 518, 520, 522, 524, 526 which represent context and/or information derived from a node in the second hierarchical level. Below the third hierarchical level may be a fourth hierarchical level comprised of a node 528 which represents context and/or information derived from node 514 in the third hierarchical level. Shown at the lowest hierarchical level is a node 530 which represents a personal knowledge repository indicating that activity graph 500, including the context and information and other data/information recorded by activity graph 500, may be stored or otherwise maintained within the personal knowledge repository associated with the employee.

For example, in the example of FIG. 5, the root node is connected to email message node 502 by an edge labeled "Mail" indicating an email communication. Email message node 502 is connected to person node 512 by an edge labeled "Person" indicating the email communication is with the indicated person. Email message node 502 is also connected to action list node 514 by an edge labeled "Action" indicating the email communication is about or gets into actions in the action list. Action list node 514 is connected to stakeholder node 528 by an edge labeled "Context" indicating the relationship between the employee, person, actions, and/or the stakeholders. As another example, the root node is connected to chat message node 504 by an edge labeled "Chat" indicating a chat communication. Chat message node 504 is connected to project node 516 by an edge labeled "Has" indicating the chat communication has the indicated project. Chat message node 504 is also connected to proposal node 518 by an edge labeled "Includes" indicating the chat communication includes the indicated proposal. As still another example, the root node is connected to call node 506 by an edge labeled "Call" indicating an oral communication. Call node 506 is connected to project node 516 by an edge labeled "Has" indicating the oral communication has the indicated project. Call node 506 is also connected to proposal node 518 by an edge labeled "Includes" indicating the oral communication includes the indicated proposal. As a further example, the root node is connected to search results node 508 by an edge labeled "Surfing" indicating a surfing action or task. Search results node 508 is connected to cloud node 520 by an edge labeled "Domain" indicating the cloud as a domain of the surfing task. Search results node 508 is also connected to AI node 520 by an edge labeled "Domain" indicating AI as a domain of the surfing task. In general, the relationship between certain pairs of nodes allow for determining where and how the employee has interacted and the context of the interaction.

It will be appreciated that the specific notation used herein to represent an activity graph, and the various aspects associated with the nodes and relationships between certain pairs of nodes, is for illustration, and one skilled in the art will appreciate that the nodes and relationships between certain pairs of nodes and the labeling of the relationships, may be represented using other descriptive techniques. Furthermore, and in some embodiments, the activities tracked and recorded for an employee need not be modeled as a graph, as will be appreciated in light of this disclosure.

FIG. 6A is a diagram showing an illustrative job profile template, in accordance with an embodiment of the present disclosure. Illustrative job profile template 600 may be a generic template for generating a job profile for a specific job position within the organization. The job profile template serves as a blueprint for generating the job profile. The organization can create (or "generate") different job profile templates for the different job positions in the organization. The job profile template can organize the text which describe the job profile. The job profile template can include text and sentences that briefly describe the organization or aspects of the organization, and additional sentences specific to the specific job position, such as required skills, preferred skills, etc., which are to be provided to generate the job profile. For example, in the example of FIG. 6A, job profile template 600 can include placeholders (e.g., (e.g., "<Role>", <Experience>", "<Context>", "<Responsibility>", "<Domain>", "<Function>", "<Tech-Domain>", "<Tech-Domain-Function>", "<SoftSkills>", and "<Experience>") which are insertion points (or "tags") to identify where to insert text to generate a job profile using the job profile template. A placeholder in a job profile template may be descriptive of the information that is to be inserted. FIG. 6B illustrates an example job profile 650 generated from job profile template 600 of FIG. 6A. For example, job profile 650 may be for a job position associated with a particular employee within the organization, and job profile 650 may be generated from job profile template 600 using the context and information derived from the activities tracked and recorded for the particular employee.

Figure 7:
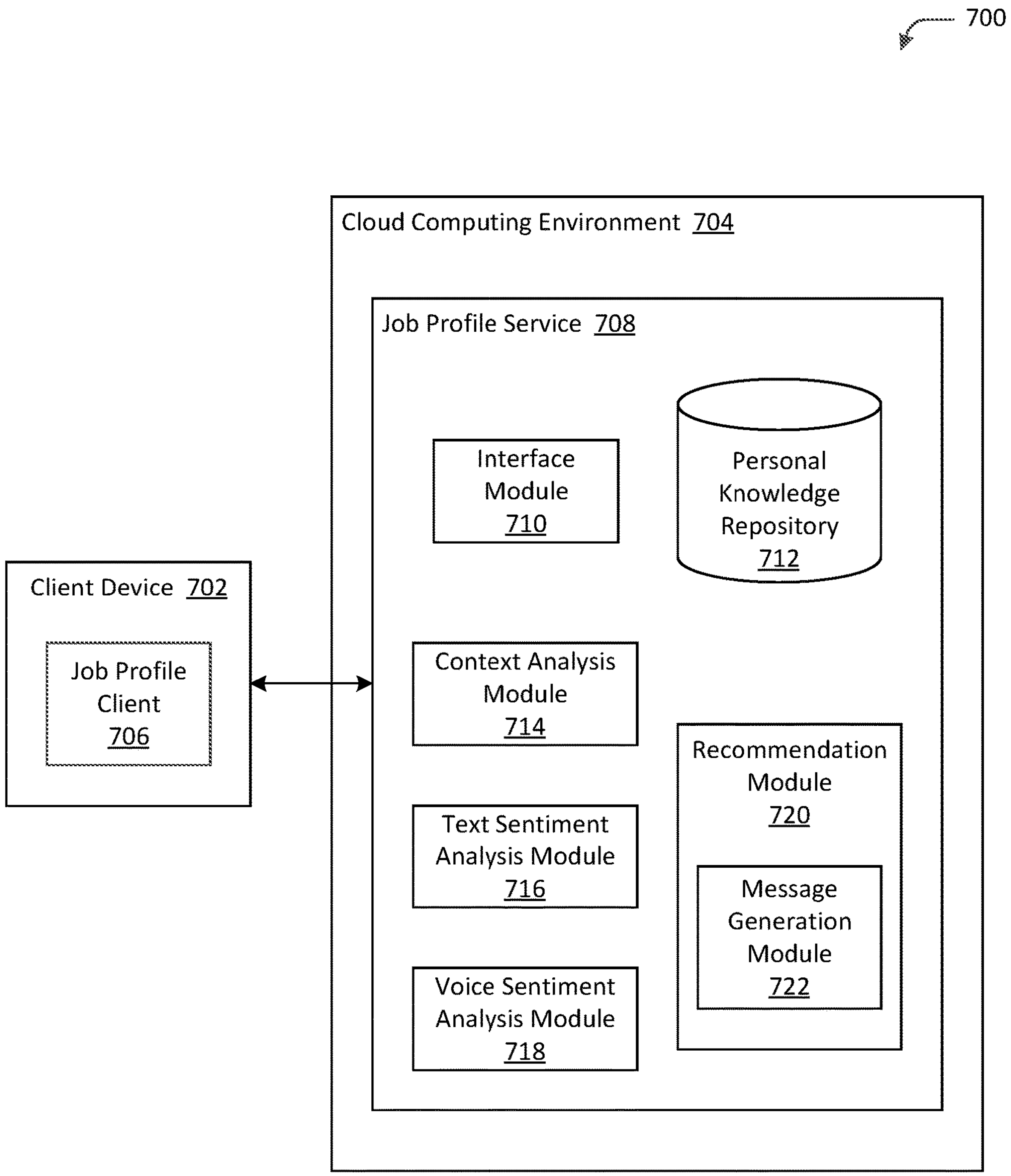
FIG. 7 is a block diagram of a system for intelligent job profile generation, in accordance with an embodiment of the present disclosure.

FIG. 7 is a block diagram of a system 700 for intelligent job profile generation, in accordance with an embodiment of the present disclosure. Illustrative system 700 includes a job profile client 706 installed on a client device 702 and configured to communicate with a cloud computing environment 706 via one or more computer networks. Client device 702 and cloud computing environment 706 of FIG. 7 can be the same as or similar to client 11 of FIG. 1 and cloud computing environment 300 of FIG. 3, respectively.

As shown in FIG. 7, a job profile service 708 can be provided as a service (e.g., a microservice) within cloud computing environment 704. Job profile client 706 and job profile service 708 can interoperate to offer intelligent generation of job profiles for the various job positions within an organization, as variously disclosed herein. To promote clarity in the drawings, FIG. 7 shows a single job profile client 706 communicably coupled to job profile service 708. However, embodiments of job profile service 708 can be used to service many client applications (e.g., job profile clients 706) installed on clients (e.g., client devices 702) associated with one or more organizations and/or users. Job profile client 706 and/or job profile service 708 may be implemented as computer instructions executable to perform the corresponding functions disclosed herein. Job profile client 706 and job profile service 708 can be logically and/or physically organized into one or more components. In the example of FIG. 4, job profile service 708 includes an interface module 710, a personal knowledge repository 712, a context analysis module 714, a text sentiment analysis module 716, a voice sentiment analysis module 718, and a recommendation module 720.

The client-side job profile client 706 is operable to monitor activities performed by a user on client device 702. For example, in some implementations, when a particular employee authenticates themselves with client device 702, job profile client 706 can begin monitoring the use of client device 702 to track work-related activities such as use of messaging applications (e.g., email applications, chat applications, etc.), use of conferencing applications (e.g., audio conferencing applications, video conferencing applications, and web conferencing applications), use of browser applications, use of work-related tools and applications, and accessing and/or opening of documents concerning the employee's job position within the organization (e.g., internal development plans, self-assessment documents, performance appraisal documents, etc.). Various techniques can be used to monitor activities on client device 702. For example, job profile client 706 can monitor user inputs (e.g., keystrokes, mouse movements, or though inputs) to client device 702. As another example, job profile client 706 can check the processes (e.g., applications) running on client device 702. As still another example, job profile client 706 can check the activity history data on client device 702.

Upon detecting a monitored activity, job profile client 706 can send information about the monitored activity to job profile service 708 over a secure communication mechanism (or "secure communication channel"). Such information about the monitored activity is also referred to herein as "activity data." Non-limiting examples of secure communication mechanisms that can be used by job profile client 706 to securely communicate with job profile service 708 include private network connections, Hypertext Transfer Protocol Secure (HTTPS), transport layer security, and token-based security with expiry settings, among others.

By way of an example, the employee may use client device 702 to communicate with one or more colleagues via exchange of email message(s). The email exchange may, for instance, be to discuss details about a project or other task assigned to the employee. Upon detecting the sending/receiving of such an email message, job profile client 706 can send the activity data (e.g., email message and, in some cases, an email thread which contains the email message, including other information associated with the email message, such as copies of attachments) to job profile service 708 via the secure communication channel.

As another example, the employee may use client device 702 to communicate with one or more colleagues via exchange of chat message(s). The chat message, for instance, may be part of a chat conversation to discuss aspects of the employee's job. Upon detecting the sending/receiving of such a chat message, job profile client 706 can send the activity data (e.g., chat message and, in some cases, the chat conversation to which the chat message belongs, including other information associated with the chat message, such as copies of attached files) to job profile service 708 via the secure communication channel.

As another example, the employee may use client device 702 to participate in a conference, such as an audio conference or a video conference, with one or more colleagues. The conference may, for instance, be to discuss project details with other members of the project team. In this case, at the conclusion of the conference, job profile client 706 can generate or otherwise obtain a transcript of the conference (e.g., an audio file and/or a text file of the transcript of the conference). Job profile client 706 can then send the activity data (e.g., transcript of the conference) to job profile service 708 via the secure communication channel.

As another example, the employee may use a browser application on client device 702 to surf (or "browse") the internet. At the conclusion of the browsing session, job profile client 706 can send the activity data (e.g., a transcript of the browsing session, e.g., a record showing how the browser application interacted with the internet) to job profile service 708 via the secure communication channel.

As another example, the employee may use an application on client device 702 to open an internal development plan document, a self-assessment document, a performance appraisal document, or another document concerning the employee's job position. When the accessed document is closed, job profile client 706 can send the activity data (e.g., copy of the accessed document, including other information about the document access) to job profile service 708 via the secure communication channel.

In the embodiment of FIG. 7, job profile client 706 is shown as a stand-alone client application. In other embodiments, job profile client 706 may be implemented as a plug-in or extension to another application on client device 702, such as, for example, an enterprise client application. In some embodiments, job profile client 706 may be implemented as a background process on client device 702.

Referring to the cloud-side job profile service 708, interface module 710 is operable to provide an interface to job profile service 708. For example, in one embodiment, interface module 710 may provide a communication channel, such as a secure communication channel, for communicating with client-side applications, such as job profile clients. For example, a client application (e.g., job profile client 706) on client device 702 can send messages (e.g., activity data) to job profile service 708 via the secure communication channel, wherein the messages are received and processed by interface module 710 or one or more other components of job profile service 708.

In some embodiments, interface module 710 may include user interface (UI) controls/elements which may be presented on a UI of a client application on a client device and utilized to access job profile service 708. For example, a user can click/tap/interact with the presented UI controls/elements to authenticate themselves with job profile service 708. Once authenticated, the user can click/tap/interact with the presented UI controls/elements to specify a job position and request generation of a job profile for the specified job position. As another example, an authorized user can click/tap/interact with the presented UI controls/elements to view one or more job profiles generated by job profile service 708. For example, a job profile may be displayed using the UI controls/elements on the client device. Generally, the presented UI controls/elements can be used to interact with job profile service 708 (e.g., send requests to and receive responses from job profile service 708).

Context analysis module 714 is operable to analyze activity data received from a job profile client (e.g., job prolife client 706) to understand the intent conveyed by the activity data. The intent may be indicative of the purpose or objective of the activity corresponding to the activity data and answer the questions who, what, when, where, and/or how conveyed by the activity data as they relate to performance of a job position. Understanding the intent of the activity data allows for or assists in understanding the type of action (e.g., tasks, duties, function, responsibilities, etc.) conveyed by the activity corresponding to or recorded by the activity data.

For example, suppose the activity data corresponds to an email message sent/received by an employee. In this example, context analysis module 714 can analyze the contents of the email message, along with other information related to the email message, to understand the intent of the email message. Continuing this example, suppose that the email message is about a contract to purchase a particular product. In this example, context analysis module 714 can analyze the text of the email message and determine that the intent of the email message is a discussion about procuring the particular product. Context analysis module 714 may also determine that the domain of the email message is the product being discussed and the context (e.g., action) is to procure the particular product being discussed in the email message.

In some embodiments, context analysis module 714 can utilize machine learning (ML) and natural language processing (NLP) to analyze activity data and to understand an intent conveyed by the activity data. For example, in some implementations, context analysis module 714 can utilize a bidirectional long short-term memory (Bi-LSTM) model to derive an intent conveyed by the activity data (e.g., to perform intent classification of the activity data). Bi-LSTM is a sequence processing model comprised of two LSTMs: one LSTM taking the input in a forward direction, and the second LSTM taking the input in a backwards direction.

This effectively increases the amount of information available to the network, thus improving the context available to the algorithm (e.g., knowing what words immediately follow as well as precede a word in a sentence).

The Bi-LSTM model may be trained and tested using machine learning techniques with a modeling dataset generated from a corpus of intent data. The corpus of intent data may be specific to a business domain (e.g., marketing and sales, engineering, manufacturing, supply chain management, human resources, etc.) within the organization. Using modeling datasets specific to the various business domains within the organization allows for generating Bi-LSTM models specifically trained for an individual business domain. For example, a first trained Bi-LSTM model may be generated for the marketing and sales business domain, a second trained Bi-LSTM model may be generated for the engineering business domain, a third trained Bi-LSTM model may be generated for the manufacturing business domain, etc. In this case, the first trained Bi-LSTM model can be applied to activity data corresponding to an activity associated with an employee in marketing and sales (e.g., an employee in the marketing and sales domain) to classify the intent of the activity data. Similarly, the second trained Bi-LSTM model can be applied to activity data corresponding to an activity associated with an employee in engineering (e.g., an employee in the engineering domain) to classify the intent of the activity data. Generally, once trained, the trained Bi-LSTM model can categorize input text data into one or more intents based on the presence or absence of key phrases (or "keywords") in the input text data as learned from the training samples in the modeling dataset.

Context analysis module 714 can store the intent (e.g., the context and information) derived from the activity data within personal knowledge repository 712, where it can subsequently be retrieved and used. For example, the context and information associated with a particular job position can be retrieved from context analysis module 714 and used to generate a job profile for the particular job position. In some embodiments, personal knowledge repository 712 may correspond to a storage service within the computing environment of job profile service 708.

In some embodiments, context analysis module 714 can securely store the context and information derived from the activity data within personal knowledge repository 712. This can be accomplished, for example, by not storing personal information of the employee, such as an employee ID, name, email address, Personal Identifiable Information (PII), or any other information indicative of the identity of the employee, within personal knowledge repository 712. In other words, context analysis module 714 does not persist any personal information of the employee. Note that, even without the personal information of the employee, the stored context and information derived from the activity data can still be associated with a job position since the organization has knowledge of the employee's job position. Thus, the securely stored context and information derived from the activity data can still be associated with a job position (e.g., the job position of the employee who performed the activity corresponding to the activity data).

In some embodiments, context analysis module 714 can convert or transform the context and information derived from the activity data into a graph format, such as the activity graph described above in the context of FIG. 5. Context analysis module 714 can then store the activity graph modeling the context and information derived from the activity data (e.g., the context and information associated with a job position) within personal knowledge repository 712. In some embodiments, the context and information derived from the activity data may be stored in an encrypted format within personal knowledge repository 712.

Text sentiment analysis module 716 is operable to analyze activity data received from a job profile client (e.g., job prolife client 706) to understand the sentiment conveyed by the activity data. It is appreciated that the sentiment conveyed in text data (e.g., written communication or message) may be important to understanding the context of the text data. In many cases, activity data corresponding to an email message, a chat message, or other type of communication, typically includes text data. In these cases, text sentiment analysis module 716 can analyze the text (i.e., text data) included in the activity data to determine a sentiment, such as worry, happy, neutral, or sad, among others, expressed in the text. In some cases, this can be accomplished by analyzing the text data to identify the positive or negative intensity of words, phrases, and symbols within the text, punctuation, emojis, less expressive text, and delayed expressive text.

In some embodiments, text sentiment analysis module 716 can utilize ML and Natural Language Understanding (NLU) to analyze the text data to understand the sentiment conveyed by the text data. For example, in some implementations, text sentiment analysis module 716 can utilize a Bi-LSTM model to predict a sentiment conveyed by the text data. The Bi-LSTM model may be trained and tested using machine learning techniques with a modeling dataset generated from a corpus of sentiment data. Once trained, the trained Bi-LSTM model of text sentiment analysis module 716 can, in response to input of text data, predict a sentiment conveyed by the text data More particularly, the trained Bi-LSTM model can repeatedly predict the sentiment as each token in a piece of text ingested, and output a prediction (i.e., a sentiment prediction) after seeing all the tokens in the piece of text. In some embodiments, text sentiment analysis module 716 can store the predicted sentiment within personal knowledge repository 712, where it can subsequently be retrieved and used. For example, the information indicative of the predicted sentiment can be stored as part of (e.g., included with) the context and information stored for the activity data from which the text data is obtained (e.g., the activity data that includes the text). In some implementations, text sentiment analysis module 716 can be provided as a sub-module or other component of context analysis module 714.

In some cases, the activity data may include audio data (e.g., an audio file). For example, in the case where a tracked activity includes some form of oral communication, such as an audio conference or a video conference, the activity data corresponding to the activity may include audio data encoding the speech and other sounds of the oral communication. In this case, according to some embodiments, voice sentiment analysis module 718 can analyze the audio data included in the activity data to determine a sentiment, such as worry, happy, neutral, or sad, among others, expressed in the audio data. That is, voice sentiment analysis module 718 can determine the emotions of an employee by analyzing the employee's voice.

In some embodiments, voice sentiment analysis module 718 can utilize ML models to analyze the audio data included in the activity data to understand the sentiment conveyed by the audio data. For example, in some implementations, voice sentiment analysis module 718 can utilize a convolutional neural network (CNN) with Mel-Frequency Cepstral Coefficients (MFCCs) to predict a sentiment conveyed by the audio data. In these implementations, the MFCCs can be used to extract the features from input audio data and apply the CNN to recognize the emotions. In some implementations, voice sentiment analysis module 718 may utilize voice activity detection (VAD) or other suitable speech detection technology to detect the presence or absence of speech within the audio data. In some implementations, voice sentiment analysis module 718 may distinguish (e.g., separate) between male and female voices in the audio data to account for differences in the emotions of male and female voices. In some implementations, voice sentiment analysis module 718 may increase the sampling rate (e.g., by a factor of 2) to deal with missing features in the case of audio data of shorter length.

In some embodiments, voice sentiment analysis module 718 can store the predicted sentiment within personal knowledge repository 712, where it can subsequently be retrieved and used. For example, the information indicative of the predicted sentiment can be stored as part of (e.g., included with) the context and information stored for the activity data from which the audio data is obtained (e.g., the activity data that includes the audio data). In some implementations, voice sentiment analysis module 718 can be provided as a sub-module or other component of context analysis module 714.

Still referring to job profile service 708, recommendation module 720 is operable to determine the details of job profiles based on context and information derived from the tracked activities of employees. For example, to generate a job profile for a particular job position, recommendation module 720 can identify the context and information to analyze to determine the details of the job profile. In some cases, the identified context and information may be context and information derived from activity data corresponding to activities tracked for a single employee. For example, it may be the case that only one employee is associated with the job position or each employee is associated with a different job position. In other cases, the identified context and information may be context and information derived from activity data corresponding to activities tracked for multiple employees (e.g., a team of employees). For example, it may be the case that one or more employees are associated with the job position (e.g., one or more employees have the same job position). In any case, recommendation module 720 can retrieve the context and information which need to be analyzed, for example, from personal knowledge repository 712, and analyze the retrieved context and information to determine (e.g., identify) the details of a job profile for the particular job position. Non-limiting examples of the details of a job profile that can be determined include the actions, such as the competencies, tasks, duties, function, responsibilities, etc., which are desired for the job position corresponding to the job profile. The determined actions, e.g., tasks, duties, function, responsibilities, etc., are specific for the particular job position for which the job profile is being generated. The determined details can then be used to complete a job profile template generated for the job position.

In some embodiments, recommendation module 720 can utilize a ML model to process the context and information derived from activities tracked for a particular job position and classify the action(s) for the particular job position. For example, in some implementations, recommendation module 720 can utilize (e.g., include) a decision tree-based algorithm, such as a random forest, trained for classification using a modeling dataset generated from historical data containing multi-dimension data points (e.g., multi-dimension training samples).

TABLE 1

| Intent | Sentiment | Domain | Context | Responsibility |
|---|---|---|---|---|
| Discussion | Neutral | Cloud | Learning | Experience |
| Discussion | Positive | Cloud | Innovation | Knowledge |
| Proposal | Positive | Product | Procure | Functional Domain |
| POC | Positive | Rule AI | Design | Knowledge |
| Development Plan | Positive | Personal | HR | Skill |
| 1 × 1 | Neutral | Personal | Approval | Skill |

Table 1 shows a simplified example of the relevant features of several training samples of the modeling dataset. In the example of Table 1, the structured columns represent the different relevant features (variables) of the historical data and a row represents individual data points. The relevant features illustrated in Table 1 are merely examples of features that may be extracted from the historical data and used to generate the modeling dataset and should not be construed to limit the embodiments described herein. Also, the number of data points shown in Table 1 is merely illustrative and it should be appreciated that the modeling dataset generally contains a much larger number of data points. The intent may indicate the purpose, goal, or objective of an activity.

As shown in Table 1, the relevant features may include Intent, Sentiment, Domain, Context, and Responsibility. The feature Intent can identify an intent (e.g., objective, goal, or purpose) of the activity. In the example of Table 1, the Intent indicated for the data points can include "Discussion," "Proposal," "POC," "Development Plan," and "1×1." The feature Sentiment can indicate a sentiment (e.g., emotion) conveyed in an activity. In the example of Table 1, the Sentiment indicated for the data points can include "Neutral" and "Positive." The feature Domain can indicate a domain (e.g., field or area) associated with an activity. In the example of Table 1, the Domain indicated for the data points can include "Cloud," "Product," "Rule AI," and "Personal." The feature Context can indicate a context of an activity. In the example of Table 1, the Context indicated for the data points can include "Learning," "Innovation," "Procure," "Design," "HR," and "Approval." The feature Responsibility can indicate a job responsibility conveyed in an activity. In the example of Table 1, the Responsibility indicated for the data points can include "Experience," "Knowledge," "Functional Domain," and "Skill."

The random forest is a supervised learning algorithm that builds (e.g., constructs) an ensemble of complex decision trees (e.g., classification decision trees). The decision trees may be trained using bagging (also known as bootstrap aggregation). Bagging is a parallel ensemble method where the individual decision trees are trained on a subset of the modeling dataset (e.g., the individual decision trees are trained on different data samples and different features). Each decision tree is trained independently and generates a prediction. The final prediction (e.g., output) of the random forest classifier is based on aggregating the predictions of the individual decision trees. Hyperparameter tuning, such as, for example, adjusting the number of classifiers (e.g., the classification decision trees) constructed in the random forest classifier, may be performed to improve the accuracy of the ML model.

Figure 8:
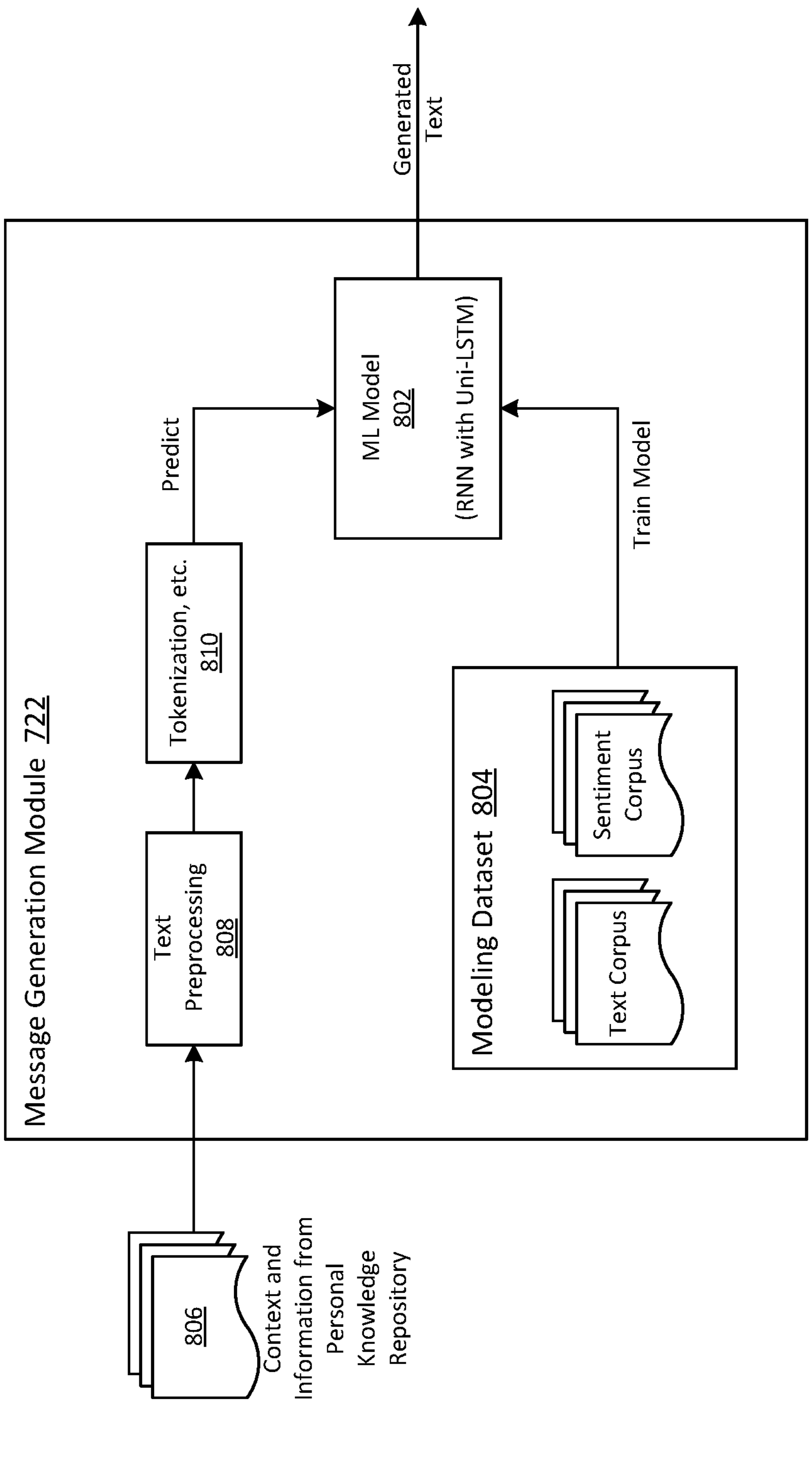
FIG. 8 shows a diagram of an example topology of a message generation module including a ML model, in accordance with an embodiment of the present disclosure

In one embodiment, as can be seen in FIG. 7, recommendation module 720 can include a message generation module 722. Message generation module 722 is operable to generate text (e.g., natural language) for use in generating a job profile for a job position. In particular, the generated text may be used to complete a job profile template generated for the job position. In some embodiments, message generation module 722 can utilize a ML model, such as recurrent neural network (RNN) with unidirectional LSTM (Uni-LSTM) to generate the text. FIG. 8 shows a diagram of an example topology of message generation module 722 including the ML model, in accordance with an embodiment of the present disclosure. In FIG. 8, like elements of FIG. 7 are shown using like reference designators.

As shown in FIG. 8, message generation module includes a ML model 802 (e.g., an RNN with Uni-LSTM, sometime referred to herein more simply as "Uni-LSTM"). The Uni-LSTM model provides high performance through its ability to recognize longer sequences of data. ML model 802 can be trained using machine learning techniques on a modeling dataset 804 comprised of a text corpus and a sentiment corpus. For example, the text and sentiment corpus can contain the dialog/text to be developed and the associated words/token to be matched. Modeling dataset 804 preparation can include data preprocessing—e.g., punctuation removal, noise removal (e.g., removing whitespaces, characters, digits, and items of text which can interfere with the extraction of features from the data), stop words removal, stemming, lemmatization, lower casing of the words, etc. The data preprocessing may also include tokenization of the sentences to extract tokens (e.g., terms and/or words) from the corpus of data. In some implementations, tokenization may be performed using a Tokenizer provided by Keras or another open-source library/project. As the resulting datasets generated with the sequence of tokens can vary in length, padding may be performed to make the sequences of tokens the same length. Predictors and labels can be created before the tokens are fed into ML model 802. In some implementations, the N-gram sequence may be selected as a predictor and the N-gram next word as a label. Once model 802 is trained with the predictors and labels, the trained ML model 802 is operable to generate text (e.g., a sequence of words or a message).

In operation, in the example of FIG. 8, context and information 806 may be input to message generation module 722. For example, recommendation module 720 can input context and information 806 from personal knowledge repository 712 to determine details of a job profile. In response, message generation module 722 may perform text preprocessing 808 and tokenization 810, etc., to prepare the input context and information 806 for input to ML model 802. Message generation module 722 can then input the prepared context and information 806 to ML model 802. In response to receiving the input, ML model 802 can generate text according to the input context and information 806. In some implementations, ML model 802 (e.g., the Uni-LSTM implementation of ML model 802) can include: an input layer that takes as input the sequence of words (e.g., the input context and information 806); an LSTM layer that computes an output using LSTM units; a dropout layer (or "regularization layer") that randomly turns off some neuron' activations in the LSTM layer; and an output layer that computes a probability of the best possible next word as an output. For example, given an input sequence of words, ML model 802 can generate text such as, "Knowledge of Cloud Computing and its trends," "Effective stakeholder management skills," and "Relevant certification in Digital Twin," to provide a few examples. The text output from ML model 802 can then be used to generate the job profile.

FIG. 9 is a flow diagram of an example process 900 for generating a job profile, in accordance with an embodiment of the present disclosure. Illustrative process 900 may be implemented, for example, within system 700 of FIG. 7. In more detail, process 900 may be performed, for example, in whole or in part by context analysis module 714, text sentiment analysis module 716, voice sentiment analysis module 718, recommendation module 720, and message generation module 722, or any combination of these including other components of system 700 described with respect to FIG. 7.

With reference to process 900 of FIG. 9, at 902, activity data may be received. For example, activity data can be received from job profile client 706 on a client device 702 being used by an employee. The received activity data may be about an activity being tracked for the employee. Activity data may be received on a continuous or periodic basis. For example, activity data may be received as employees of an organization perform the activities. That is, as the employees perform the activities, activity data about an activity performed by an employee may be received. In some embodiments, the activity data about the various activities performed by the employees may be received over secure communication channels.

At 904, context and information may be derived (e.g., extracted) from the received activity data. For example, in the case where the activity data includes text data, ML and NLP techniques can be applied to the text to derive the context and information (e.g., understand the context, role, domain, intent, sentiment, etc. conveyed by the activity). In the case where the activity data includes audio data, voice analysis techniques can be applied to the audio data to derive the context and information.

At 906, the context and information derived from the activity data may be associated with a job position. For example, if the context and information is derived from activity data corresponding to an activity performed by a software test engineer, the context and information can be associated with a job position "Software Test Engineer." As another example, if the context and information is derived from activity data corresponding to an activity performed by a systems development team leader, the context and information can be associated with a job position "Systems Development Team Lead." As another example, if the context and information is derived from activity data corresponding to an activity performed by a business analyst, the context and information can be associated with a job position "Business Analyst."

At 908, the context and information, including information indicative of the job position associated with the context and information (e.g., a job title), may be stored within a repository (e.g., personal knowledge repository 712 of FIG. 7). In some embodiments, the context and information may be securely stored within the repository (e.g., without persisting personal information of the employee). In some embodiments, the context and information may be stored in an encrypted format within the repository.

At 910, a request to generate a job profile for a job position may be received. For example, the request can be received from job profile client 706 on a client device 702 being used by an employee of the organization who is authorized to generate job profiles (e.g., a human resource manager). In some cases, the request can include an indication of the job position for which the job profile is to be generated.

At 912, the context and information associated with the job position may be retrieved from the repository. For example, the retrieved context and information can include the context and information derived from the various activities (e.g. activity data corresponding to the various activities) being tracked for employees having the job position within the organization. That is, the retrieved context and information may be about one or more activities performed by one or more employees having the job position within the organization.

At 914, the job profile for the job position may be generated based on the retrieved context and information. For example, ML models can be utilized to process the retrieved context and information to determine the details (e.g., tasks, duties, function, responsibilities, etc.) of the job position. The determined details can then be used to generate the job profile for the job position. In some embodiments, the job profile may be generated by using the determined details to complete a job profile template.

In some embodiments, additional operations may be performed. For example, in one embodiment, the generated job profile can be sent or otherwise provided to a requesting user (e.g., the employee who sent the request to generate the job profile) in a response to the received request. In some embodiments, the generated job profile may be sent over a secure communication channel. The job profile may then be presented within a user interface of a client application (e.g., job profile client 706 of FIG. 7) on a client device, the requesting user can then take appropriate action based on the presented job profile (e.g., accept the job profile, edit the job profile, discard the job profile, etc.).

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A computer-implemented method for generating job profile text using a trained neural network, the method comprising:

building, by a computing device, a machine learning (ML) model by:

generating a modeling dataset from a text corpus and a sentiment corpus using a natural language process, wherein the modeling dataset comprises a plurality of training samples, each training sample including feature values derived from the text corpus and the sentiment corpus and a corresponding job-profile text sequence;

implementing through a recurrent neural network, by the computing device, a unidirectional long short-term memory model; and training the unidirectional long short-term memory model to generate job profile text using a plurality of training samples, the plurality of training samples generated from the modeling dataset;

receiving, by a computing device, activity data corresponding to activities of an employee over a period of time;

deriving from the activity data, by the computing device, context and information by organizing the activity data into an activity graph and generating, from the activity graph, the context and information, the context and information comprising an intent derived using a first bidirectional long short-term memory model and a sentiment derived using a second bidirectional long short-term memory model, wherein the first and second bidirectional long short-term memory models process sequences of tokens in both forward and backward directions using the activity graph to derive the intent and the sentiment, thereby improving a contextual representation of the activity data used by the machine learning model;

associating, by the computing device, the context and information to a job position;

storing, by the computing device, the context and information within a personal knowledge repository; and responsive to a request to generate a job profile for the job position:

retrieving, by the computing device from the repository, the context and information associated with the job position;

inputting, by the computing device, the context and information to the ML model; and generating, from the ML model, by the computing device, a job profile text.

2. The method of claim 1, wherein the activities includes a written communication with a colleague.

3. The method of claim 1, wherein the activities includes an oral communication with a colleague.

4. The method of claim 1, wherein the activities includes an access of a document related to the job position.

5. The method of claim 1, wherein the activities includes a surfing task.

6. The method of claim 1, wherein the context and information include one or more of a role, a domain, an intent, and a sentiment.

7. The method of claim 1, wherein the activity data is received over a secure communication channel.

8. The method of claim 1, wherein generating the job profile text includes completing a job profile template generated for the job position.

9. The method of claim 1, wherein the context and information are stored in an encrypted format within the repository.

10. A computing device comprising:

one or more non-transitory machine-readable mediums configured to store instructions; and one or more processors configured to execute the instructions stored on the one or more non-transitory machine-readable mediums, wherein execution of the instructions causes the one or more processors to carry out a process comprising:

building a machine learning (ML) model by:

generating a modeling dataset from a text corpus and a sentiment corpus using a natural language process, wherein the modeling dataset comprises a plurality of training samples, each training sample including feature values derived from the text corpus and the sentiment corpus and a corresponding job-profile text sequence;

implementing through a recurrent neural network a unidirectional long short-term memory model; and training the unidirectional long short-term memory model to generate job profile text using a plurality of training samples, the plurality of training samples generated from the modeling dataset;

receiving activity data corresponding to activities of an employee over a period of time;

deriving from the activity data context and information by organizing the activity data into an activity graph and generating, from the activity graph, the context and information, the context and information comprising an intent derived using a first bidirectional long short-term memory model and a sentiment derived using a second bidirectional long short-term memory model, wherein the first and second bidirectional long short-term memory models process sequences of tokens in both forward and backward directions using the activity graph to derive the intent and the sentiment, thereby improving a contextual representation of the activity data used by the machine learning model;

associating the context and information to a job position;

storing the context and information within a personal knowledge repository; and responsive to a request to generate a job profile for the job position:

retrieving, from the repository, the context and information associated with the job position;

inputting the context and information to the ML model-to-generate; and generating from the ML model a job profile text.

11. The computing device of claim 10, wherein the activities includes one of a written communication, an oral communication, an access of a document related to the job position, and a surfing task.

12. The computing device of claim 10, wherein the context and information include one or more of a role, a domain, an intent, and a sentiment.

13. The computing device of claim 10, wherein the activity data is received over a secure communication channel.

14. The computing device of claim 10, wherein generating the job profile includes completing a job profile template generated for the job position.

15. A computer-implemented method for generating job-profile text using a trained neural network, the method comprising:

building, by a computing device, a machine-learning (ML) model implemented as a recurrent neural network comprising a unidirectional long short-term memory (LSTM) layer and configured to generate job-profile text, the building comprising:

generating, using natural language processing, a modeling dataset from a text corpus and a sentiment corpus; and training the recurrent neural network using training samples from the modeling dataset;

receiving, by the computing device, activity data corresponding to activities of an employee over a period of time;

deriving, by the computing device, context and information from the activity data, the deriving comprising organizing the activity data into an activity graph and generating, from the activity graph, feature values including an intent value derived using a first bidirectional LSTM model and a sentiment value derived using a second bidirectional LSTM model, wherein the first and second bidirectional long short-term memory models process sequences of tokens in both forward and backward directions using the activity graph to derive the intent and the sentiment, thereby improving a contextual representation of the activity data used by the machine learning model;

associating, by the computing device, the context and information with a job position;

storing, by the computing device, the context and information in a personal knowledge repository implemented using non-transitory computer-readable storage and maintained in association with the job position; and in response to receiving, by the computing device, a request to generate a job profile for the job position:

retrieving, from the personal knowledge repository, the context and information associated with the job position;

providing the context and information as input to the trained recurrent neural network; and generating, by the trained recurrent neural network, job-profile text for the job position based on the context and information.

16. The machine-readable medium of claim 15, wherein the activities includes one of a written communication, an oral communication, an access of a document related to the job position, and a surfing task.

* * * * *